J. J. SELTENREICH.
COLLAR MOLDING MACHINE.
APPLICATION FILED JUNE 21, 1915.
1,252,186. Patented Jan. 1, 1918.
4 SHEETS—SHEET 1.
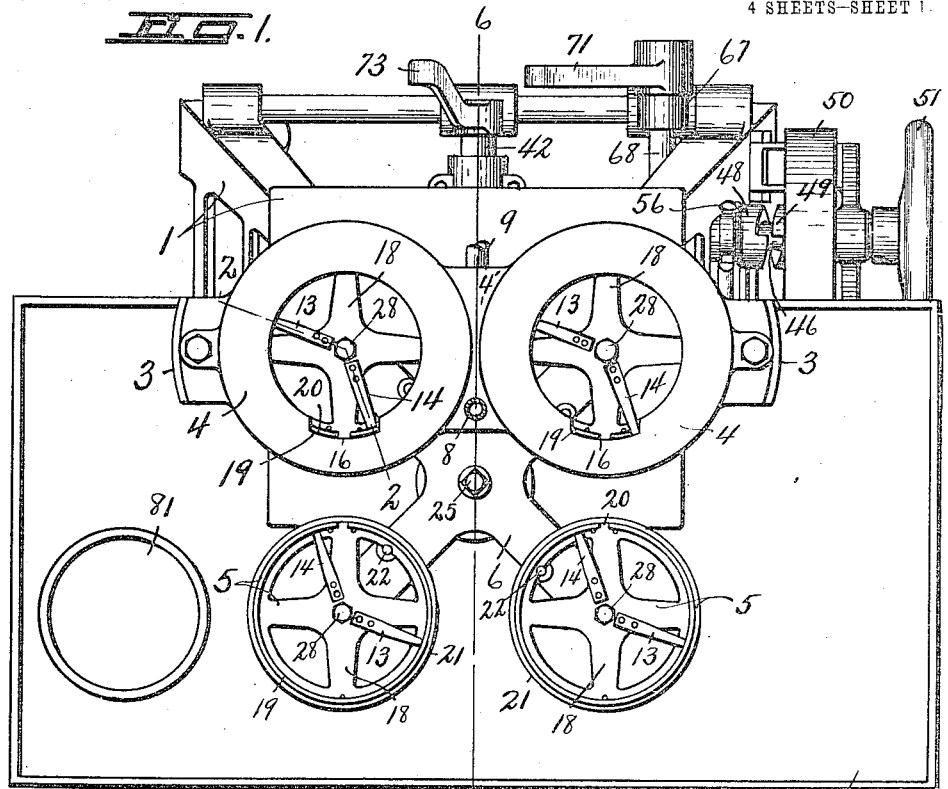
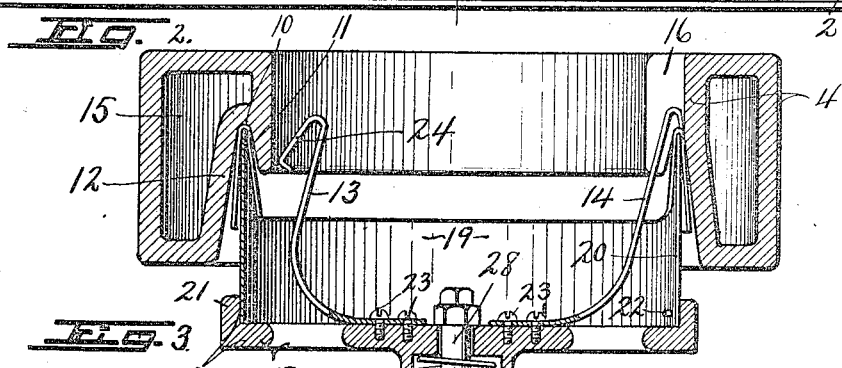
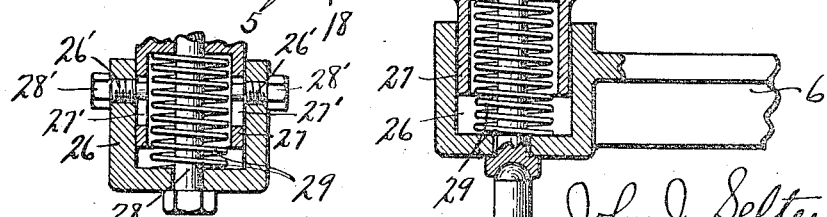
WITNESSES:
John J. Seltenreich
INVENTOR
BY Howard P. Denison
ATTORNEY.

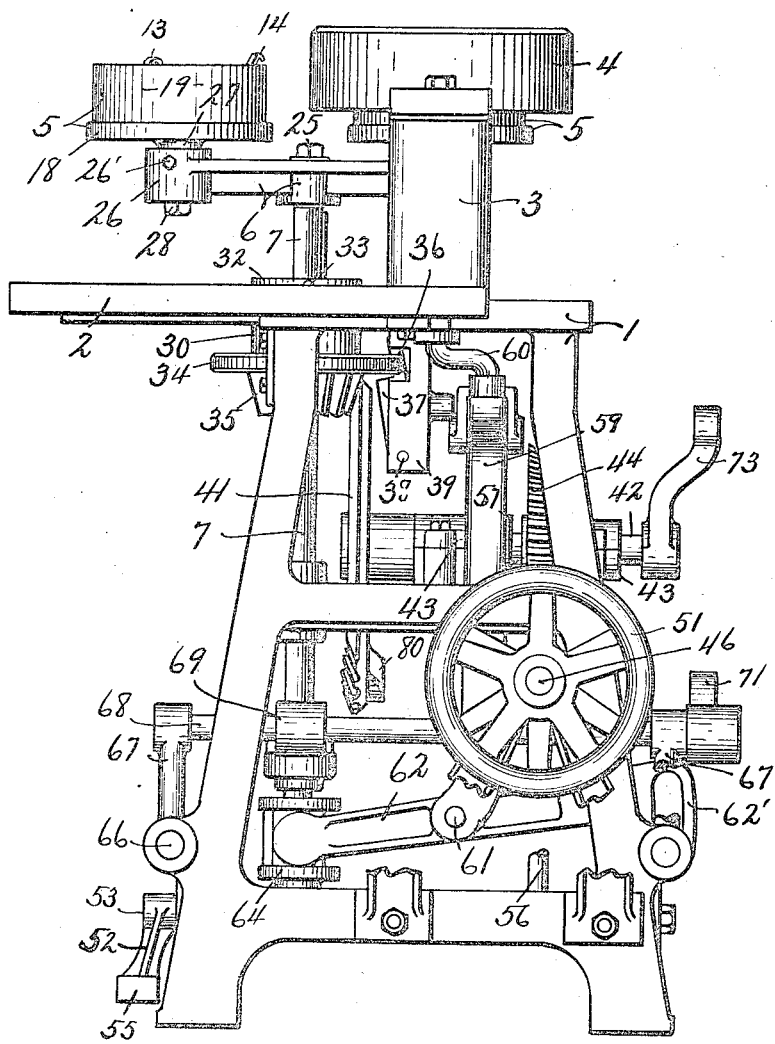

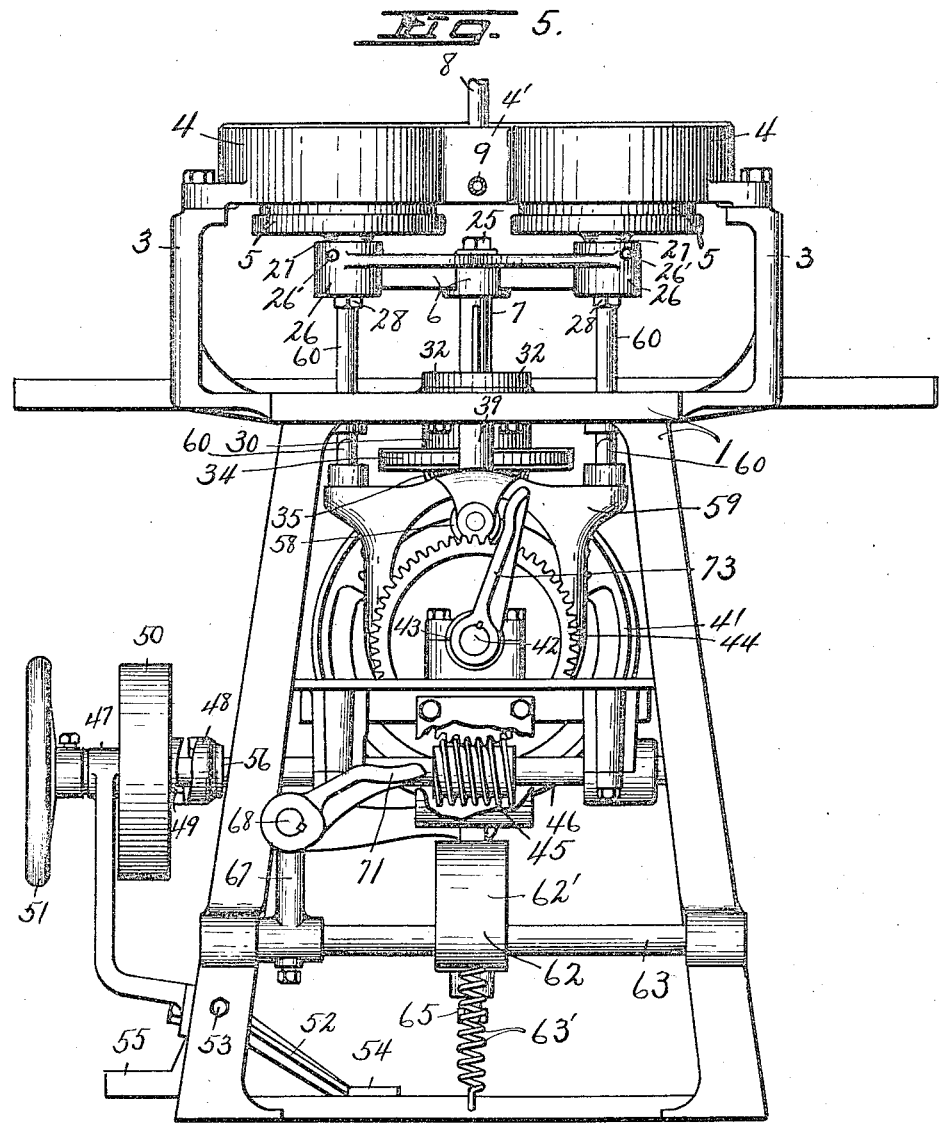

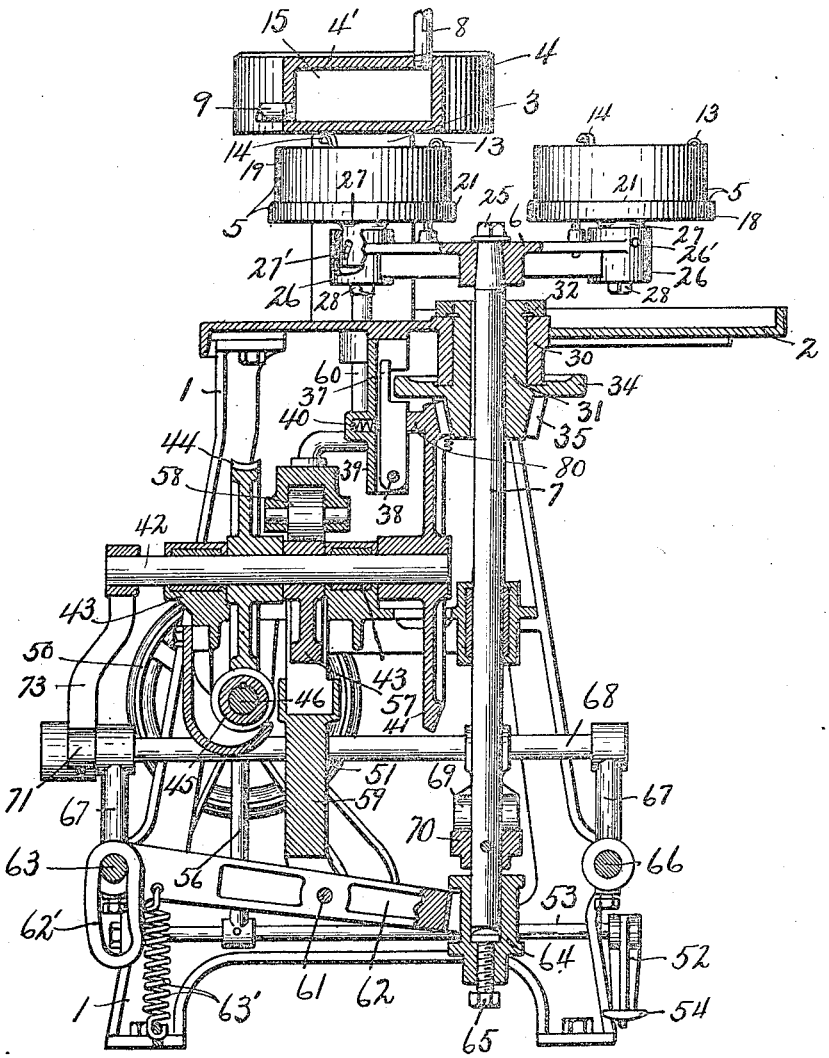

UNITED STATES PATENT OFFICE.

JOHN J. SELTENREICH, OF CHICAGO, ILLINOIS, ASSIGNOR TO NATIONAL CHEMICAL CO., OF SYRACUSE, NEW YORK, A CORPORATION OF NEW YORK.

COLLAR-MOLDING MACHINE.

1,252,186.  Specification of Letters Patent.  Patented Jan. 1, 1918.

Application filed June 21, 1915.  Serial No. 35,317.

*To all whom it may concern:*

Be it known that I, JOHN J. SELTENREICH, a citizen of the United States of America, and a resident of Chicago, in the county of Cook, in the State of Illinois, have invented new and useful Improvements in Collar-Molding Machines, of which the following, taken in connection with the accompanying drawings, is a full, clear, and exact description.

This invention relates to certain improvements in collar molding and edging machines of the class set forth in my co-pending application Serial No. 687,153, filed March 29, 1912, in which the folded collars are placed by hand upon one or more circular forms which are then shifted and brought into pressing coaction with heated heads and automatically given a rotary oscillating movement for shaping the collar and ironing or smoothing its folded edge to remove any roughnesses, wrinkles, swells, or other irregularities in such fold or adjacent portions of the collar.
With this class of machines utilizing a rotary and vertically movable carriage forming a support for a plurality of eccentrically positioned collar supporting forms or rings, the power for raising the carriage vertically, and thereby the rings, to bring the rings into pressing coaction with the heated heads, being applied axially of the carriage through the medium of a vertically disposed shaft, the pressing coaction of the collar supporting ring and the shaping head tends to tilt the carriage and distort the parts whereby the collar supporting rings become out of alinement with the sockets in the shaping heads, whereby a wedging action takes place between the collar supporting ring and the socket tending to further distort the carriage and the ring-supporting elements, resulting in an uneven pressure upon the edge of the collar to be molded.
My improvement, therefore, consists in applying the pressure for molding and shaping the collar at two spaced points:—first, axially of the carriage, and, second, axially of the collar supporting ring, rather than solely axially of the carriage, the means for applying the pressure axially of the ring insuring an exact alinement of the ring with the socket in the head and relieving the carriage of a portion of the strain of forcing the elements into pressing coaction to mold the collar.

The broad idea of the invention contemplates the use, in combination with a rotatable and vertically movable carriage carrying eccentrically positioned collar supports, of means for simultaneously applying pressure axially of the carriage and axially of the collar supporting ring.

Other features of the invention relate to the combination with the means last described of two coacting pressing elements, one of the same adapted to have a rotary or rotary oscillating movement during the pressing coaction.

Other objects and features relate to the specific construction and arrangement of the parts by which the above objects are accomplished, as will more clearly appear from the following description, taken in connection with the accompanying drawings, in which—

Figure 1 is a top plan of a collar molding and edging machine embodying the various features of my invention.

Fig. 2 is an enlarged vertical sectional view through one of the ironing heads and collar supporting forms, together with the adjacent portion of the supporting parts for said form, taken on line 2—2, Fig. 1, the parts being shown in their coacting pressing position with an interposed collar between the head and form, and also showing the spring fingers for retaining the collar upon the form while the latter is being forced to and from its pressing position.

Fig. 3 is a view of the telescoping hubs for supporting the collar receiving form or ring, showing the means for producing the rotary oscillating movement of the form.

Figs. 4 and 5 are, respectively, a side and a rear elevation of the machine.

Fig. 6 is a central vertical sectional view of the same machine, taken on line 6—6, Fig. 1.

The machine comprises an upright supporting frame —1— upon which is mounted a work-table —2— and upright brackets —3— rising from the table for supporting a plurality of, in this instance two, shaping or ironing heads —4—, leaving sufficient space between the table —2— and the heads, and also between the brackets —3— for the free reciprocatory and rotary movement of a plurality of, in this instance two, pairs of collar supporting forms or rings —5— and their supporting frame —6—, which latter is mounted upon a vertically movable rotary shaft —7—. The heads —4— are substantial duplicates and disposed side by side in the same horizontal plane and preferably consist of hollow cast metal rings having adjacent sides integrally united by a hollow web —4'— to which steam or other heating fluid may be supplied from any available source, through a supply pipe —8—, for heating the head to the desired temperature, and when steam is employed as the heating medium I also provide the hollow web with a drainage outlet —9—, as shown clearly in Fig. 6 of the drawings.

Each of the heads —4— is provided in its under side with an annular collar shaping groove or socket —10— concentric with the axis of the head and forming inner and outer flanges —11— and —12—, the inner flange —11— which engages the inner side of the collar being somewhat shorter vertically than the flange —12— to allow the use of suitable spring fingers —13— and —14— for retaining the collar on the form during its entrance and exit into and out of the groove —10—.

For a similar purpose, the adjacent sides of the flanges —11— and —12— are tapering or flaring downwardly, or rather converge toward the base of the groove, which is rounded in cross section so as to impart a similar rounding contour to the fold of the collar during the pressing operation.

As previously stated, each of the heads or rings —4— is hollow to form an annular steam chamber —15— which extends radially over and beyond the base of the groove —10— and downwardly in the flange —12— some distance below the lower edge of the flange —11—, leaving comparatively thin, yet rigid, intervening walls between the groove and chamber for quickly heating the base and sides of the groove.

As best seen in Figs. 1 and 2, a relatively small portion of the inner side of each of the heads or rings —4— and flange —11— is cut away to form a vertical recess —16— leading upwardly and laterally from the base of the groove —10— to receive the upturned ends or tabs —a— of a collar —A— and also to receive the upper end of one of the spring fingers as —14— which is secured to the collar support —5— and adapted to engage the upper edge of the tab —a— to hold the latter on the form —5— during its entrance into the groove of the head and to withdraw the collar when the form is withdrawn from its pressing position.

The object in flaring the side walls of the groove —10— downwardly is to facilitate the entrance of the collar and its supporting form into said groove and at the same time to cause the collar to be wedged tightly therein to give the fold and adjacent portions of the collar the desired polish or finish.

Each of the collar supporting forms —5— preferably comprises a cast metal base —18— and a circular sheet metal ring —19—, the latter being divided through one side at —20— to permit it to expand and contract or rather to yield radially at different points so as to compensate for any inequalities in the thickness of the collar and to more readily register with the sides and base of the groove during the operation of pressing the collar therein.

The collar supporting ring —19— is preferably made of comparatively thin polished metal capable of imparting a smooth finish to the inner faces of the opposite folds of the collar and to shape said collar so that the opposite sides will be slightly separated to allow a tie to be readily drawn between the folds.

The base —18— is provided with a circular marginal flange —21— within which the lower end of the collar supporting ring —19— is detachably fitted and held in place by one or more pins —22— projecting inwardly and radially from the flange —21— and adapted to enter suitable apertures in the adjacent portions of said ring, thereby permitting the ring to be detached from the base when necessary or desirable.

The spring fingers —13— and —14— are secured by a suitable fastening means as screws —23— to the base —18— and extend upwardly therefrom a sufficient distance to engage the collar when mounted upon the upper edge of the supporting ring —19—, the upper end of the spring finger —13— being bent outwardly and downwardly at —24— at an angle to the axis of the ring and is spring pressed into engagement with the inner fold of the collar to hold said collar in proper position on the form while the latter is being forced to its pressing position.

The object of inclining the portion —24— of the upper end of the spring is to allow it to ride against the lower edge of the flange —11—, while the collar is being forced in the groove of the head, but as soon as the collar supporting form and collar thereon is withdrawn from the head, this inclined portion is immediately returned to its holding position to grip the collar and carry it down with the form.

The upper end of the spring finger —14— is also returned outwardly and downwardly and adapted to engage with the upper edge of the tab —a— in the manner and for the purpose described.

The supporting frame —6— for the forms —5— is rigidly secured to the shaft —7— and for this purpose is provided with a central hub having a tapering opening therethrough fitted tightly upon a correspondingly tapered upper end of the shaft and held in place by a cap screw —25— which enters a threaded hole in the adjacent end of the shaft, said support being also provided with a series of, in this instance four, radial arms of equal length spaced uniform distances apart circumferentially and provided at their outer ends with sockets —26— for receiving the hubs as —27— of the ring supports —18—, the rings being locked by pins —22—.

The hubs —27— are preferably hollow and telescope with an easy sliding fit within the sockets or bearings —26— and are held in place against undue vertical displacement by bolts —28— passing through suitable apertures in the bottom of the sockets —26— and upper sides of the hubs —27—.

Suitable coiled springs —29— are arranged within the bearings —26— and hubs —27— around their respective bolts —28— so as to bear against the bottom of the socket or bearing —26— and upper side of the hub —27— for yieldingly supporting the forms —5—, thereby causing the collars to be pressed into and against the bases of the grooves —10— under a yielding pressure and assuring a perfect contact of all portions of the fold of the collar with the base of the groove even though the thickness of the collar at the fold may vary slightly at different points.

In order to give the collar supporting forms —5— a rotary oscillating movement as they are brought into and returned from pressing coaction with the head, the hub —27— is provided with a pair of obliquely disposed slots —27'— positioned diagonally of the hub, and the bearing or socket —26— is provided with a pair of threaded apertures for the reception of externally threaded pins —26'— having their ends projecting into the slots —27'— for giving to the collar supporting forms —5— and hub —27— a rotary oscillating movement as the same is depressed with respect to the bearing —26— by the pressing coaction with the shaping head and returned to normal position as released from pressing coaction by the spring —29—, whereby the collar is molded, ironed and edged in a single operation.

The shaft —7— is supported in an upright position midway between and some distance in front of the heads —4— and is adapted to be rotated and moved axially to successively register each pair of collar supporting forms with the grooves in the heads and to move said forms with the collars thereon into and out of said grooves and for this purpose I have provided the top of the main supporting frame —1— with a hollow hub —30— in which is journaled a rotary sleeve —31— having a central bore in which the shaft —7— is splined for axial movement and for rotary movement with the sleeve.

This sleeve —31— is inserted from the underside upwardly through the opening in the top of the frame —1— and extends some distance above said top, its upper end being threaded externally for receiving a nut —32— for engaging the upper side of the frame and holding the sleeve in operative position against downward movement, said nut being held in its adjusted position by one or more set screws —33—.

The lower end of the sleeve —31— is provided with an enlarged integral disk —34— and mutilated bevel gear —35—, the disk —34— being engaged with the underside of the hub —30— and together with the nut —32— holds the sleeve against endwise movement in either direction and at the same time permits free rotation of the sleeve and shaft.

The disk —34— constitutes one of the locking elements for holding the sleeve and shaft against rotation when the collar supporting forms are in pressing coaction with the heads —4—, and inasmuch as each pair of forms are registered successively and alternately with the heads, it is necessary to lock the shaft against rotation at each half turn and for this purpose the periphery of the disk —34— is provided with diametrically opposite notches or recesses —36— for alternately and successively receiving a movable locking pawl or detent —37—.

The pawl —37— is pivotally mounted at —38— in a bracket —39— secured to and depending from the underside of the top of the main supporting frame —1— at the rear side of the disk —34—, said bracket being provided with a vertical groove in which the pawl —37— is adapted to play and serves to hold said pawl against undue lateral movement.

This pawl is spring pressed into holding engagement with the disk —34— by means of a coil spring —40— which is mounted in a suitable socket in the bracket —39— and engages the rear edge of the pawl so as to force the latter forwardly toward the disk and at the same time permitting said pawl to be forced from its holding position at the proper time in a manner hereinafter described.

The bevel gear or pinion —35— is adapted to be driven by a mutilated gear —41— which is mounted upon a horizontal shaft —42—, said gear and pinion being proportioned and mutilated in such manner as to rotate the shaft intermittingly one-half revolution at a time and to hold the shaft —7— against rotation while the shaft —42— continues to revolve. For this purpose the ratio of the gears —35— and —41— is one to four, the gear —35— being provided with diametrically opposite toothed segments and intervening diametrically opposite smooth portions, while the gear —41— is provided with a toothed segment having about the same number of teeth as one of the segments of the gear —35— or sufficient so that when the toothed segment of the gear —41— is in mesh with either of the toothed segments on the gear —35—, it will rotate the shaft one-half revolution, the remaining portions of the gear —41— being smooth for sliding contact with the smooth portions of the gear —35—, thereby holding the shaft against rotation irrespective of the locking pawl —37—.

The shaft —42— is journaled in suitable bearings —43— on the main supporting frame —1— and is provided with a worm gear —44— which meshes with a worm —45— on a main driving shaft —46—.

This shaft —46— is also journaled in suitable bearings —47— on the main supporting frame and is provided with a clutch section —48— splined thereon and movable into and out of engagement with a corresponding clutch section —49— on the adjacent end of a driving pulley —50— which is loose on the shaft and adapted to be connected to any available source of power not shown, said shaft —46— being also provided with a hand wheel —51— on its outer end whereby it may be rotated to operate the machine at will when necessary.

The sliding clutch section —48— is moved into and out of interlocking engagement with the pulley —50— by means of a bell-crank lever —52— which is secured to a rock shaft —53— and is provided with opposite pedals —54— and —55— for rocking the shaft in reverse directions.

This rock shaft —53— is journaled in the main supporting frame and provided with an upwardly projecting arm —56— rigid thereon and having its upper end engaged in an annular groove in the clutch section —48— so that by rocking the lever —52— in one direction, as for example, by depressing the pedal —55—, the clutch member —48— will be thrown into locking engagement with the clutch section —49— to lock the pulley —50— to the shaft —46— or when rocked in the other direction by means of the pedal —54—, the clutch section —48— will be thrown from its locking position, thereby releasing the pulley and permitting it to rotate continuously independently of the machine.

The means for reciprocating the vertical shaft —7— and collar supporting forms —5— carried thereby consists of a semi-circular cam —57— rigidly secured to the shaft —42— and adapted to engage a roller bearing —58— on the underside of the top of a vertically movable yoke —59— which surrounds the cam —57— and shaft —42— and is provided with upwardly projecting guide pins —60— playing in suitable guide openings in the top of the main supporting frame —1— so as to cause the yoke to move vertically in a straight line, it being understood that the opening in the yoke —59— in which the cam —57— plays is of sufficient size to permit free play of the cam without liability of engaging any other portions of the yoke except the roller —58—.

The lower end of the yoke —59— is pivotally connected at —61— to the intermediate portion of a forwardly and rearwardly extending rock arm —62— having its rear end provided with an elongated slot —62'— mounted upon a cross rod —63— in the lower part of the main supporting frame —1—, and its front end bifurcated and engaged between suitable shoulders of a collar —64— in which the lower end of the shaft is stepped, said collar having an axial adjusting screw —65— in its lower end upon which the lower end of the shaft rests for adjusting said shaft to the desired height relatively to the collar. The rock arm —62— is provided with a suitable spring —63'— connected to the rock arm and to the frame —1— for normally holding the arm at its limit of downward movement on the shaft —63— and the spring is of sufficient strength to normally hold the upper portion of the slot —62'— in engagement with the shaft —63— until the shaft —7— has been raised a sufficient distance to bring the collar supporting forms —5— into pressing coaction with the sockets in the shaping heads —4—, at which time the yoke —59— continues to raise the arm —62— by moving the slot —62'— upwardly along the shaft —63— against the action of the spring —63'—, for a purpose hereinafter described.

The pins or rods —60— are so formed and arranged that they extend upwardly through the table —2— at points disposed axially of the shaping heads —4— and, therefore, axially of the collar supporting forms, as they are brought under the heads by rotation of the shaft —7— and carriage —6—, and these shafts are of such length that when the carriage —6— is at the limit of its downward movement the rods —60— do not interfere with the rotation of the carriage and the forms supported thereby.

The operation of this portion of the machine is as follows: As the cam starts to raise the lever —62—, the first movement is the raising of the shaft —7— and carriage —6— until the collar supporting forms —5— come into pressing coaction with the sockets or grooves in the heads —4—, at which time the force required to raise the shaft —7— becomes sufficient to overcome the tension of spring —63'— and the slot —62'— moves upwardly along the shaft —63— so that the rods —60— continue to move upwardly after the shaft —7— has practically ceased its vertical movement until the rods contact with the heads of the bolts —28— at which time the pressure is applied to the collar supporting forms both by means of the shaft —7— and carriage —6—, and by means of the rods —60— acting directly upon bolts —28—, the pressure at all times being a resilient one due to the inclosed spring —29—. The simultaneous application of pressure axially of the carriage —6— by means of shaft —7— and axially of the form —5— by means of rod —60—, prevents any tendency to distort or bend the frame during the time when the greatest pressure is exerted upon the collar supporting form and its carriage, and the head of the bolt —28— is preferably countersunk to form a seat for engagement with a spherical or conical end of the rod —60— whereby an exact alinement of the forms with the heads is assured (see Fig. 2). Upon the return movement of the forms, the spring —63'— first moves the slot —62'— downwardly until the upper end of the slot contacts with the shaft —63— at which point the shaft —7— begins to move downwardly to return the forms to starting position.

At the front of the frame is another cross rod —66— disposed in substantially the same horizontal plane as the cross rod —63— and to these cross rods are rigidly secured upwardly projecting brackets —67— carrying a forwardly and rearwardly extending rock shaft —68— to which is secured one end of a laterally projecting rock arm —69— having its other end engaged with the upper face of a collar —70— rigid on the vertical shaft —7— for positively forcing the shaft downward in case it should fail to drop by its own gravity.

For this purpose the rear end of the rock shaft —68— is provided with an additional rock arm —71— rigidly secured thereto and adapted to be engaged by a coacting arm —73— on the rear end of the horizontal shaft —42— as shown more clearly in Figs. 1, 4 and 5.

It is now apparent that the arm —73— is mounted on the same shaft as the mutilated gear —41— and cam —57—. This cam —57— is adjusted relatively to the toothed segment on the gear —41— so that the central portion of its highest concentric surface contacting with the roller —58— of the yoke —59— is diametrically opposite said toothed segment and, therefore, elevates the shaft and collar supporting forms carried thereby into pressing coaction with the shaping heads —4— while said shaft is held against rotation or through practically half a revolution of the gear —41—, such vertical movement of the shaft and collar forming heads being accomplished through the medium of the yoke —59— and its connection with the rock arm —62—.

As soon as the high portions of the cam have passed the roller —58— on the yoke —59— during its continuous revolution, the weight of the shaft and collar supporting forms mounted thereon is ordinarily sufficient to return said forms to a plane below that of the shaping heads —4— but in case these parts should not return to their starting positions by gravity, the arm —73— on the shaft —42— will have rotated into contact with the rock arm —71—, thereby operating the rock shaft —68— and rock arm —69— to positively depress the vertical shaft and collar supporting forms below the plane of the shaping heads —4— before the toothed segment of the gear —41— engages the teeth of the pinion —35— to rotate the vertical shaft and forms carried thereby for the purpose of bringing another set of such forms with the collars thereon into registration with the shaping heads preparatory to raising said forms to repeat the pressing operation previously described.

During this operation of raising and lowering the collar supporting forms into and out of pressing coaction with the heads —4—, the shaft is positively held against rotation by the locking pawl —37— and it therefore becomes necessary to force this pawl from its locking position before the toothed segment of the gear —41— engages the teeth of the pinion —35— to rotate the shaft —7— and forms carried thereby, and for this purpose I have provided the rear face of the gear —41— with a cam —80— extending concentrically across the back and beyond the ends of the toothed segment of the gear —41—, the ends of said cam being beveled so as to ride easily against the front face of the pawl —37— to force the latter rearwardly against the action of its retracting spring out of locking engagement with the disk —34—, thereby permitting the rotation of the shaft —7— and forms —5— by the intermeshing teeth of the gears —41— and —35—.

After the collars are pressed, they are removed by hand from the forms —5— and placed into a circular chute —81— through which they may gravitate into an underlying receptacle not shown.

Operation: Assuming that the collar supporting forms are in their elevated positions as shown in Figs. 3, 4 and 5, in which one pair of forms are in pressing coaction with the heads —4— while the other pair are exposed to the front of the machine, the collars which have been previously folded are then placed by hand upon the upper edges of the forms —5—, while those which have been previously placed in the same manner upon the forms which are in pressing coaction with the heads are under pressure, ample time being afforded to place these collars on the exposed forms owing to the relatively slow intermitting action of the vertical shaft —7— and forms carried thereby.

As previously stated, the forms which are in pressing coaction with the heads remain in this position during practically half of the period of revolution of the gear —41—, thereby affording ample time for shaping and drying the fold of the collar which has been previously moistened before being placed upon the forms.

As soon as the high bearing surface of the cam —57— leaves the roller —58— of the yoke —59—, the vertical shaft —7— carrying the collar supporting forms is lowered sufficiently to bring said forms below the plane of the shaping heads —4— and immediately following this action the toothed segment of the gear —41— engages the teeth of the gear —35— to rotate the shaft —7— one-half revolution, thereby bringing the shaped and edged collars to the front of the heads and at the same time registering the forms with the unshaped and un-edged collars thereon with said heads.

Immediately after the rotation of the heads in the manner just described, the shaft is locked against rotation by reason of the engagement of the pawl —37— in one of the notches —36— of the disk —34—, whereupon the return of the cam —57— will elevate the shaft —7— and forms —5— through the medium of the yoke —59— and rock arm —62— thereby bringing the registering pair of collar supporting forms into pressing coaction with the shaping heads —4— and the rods —60— into contact with bolts —28— to apply pressure simultaneously with shaft —7—.

During this pressing operation, the operator removes the ironed collars from the exposed forms —5— and replaces unironed collars thereon ready for repetition of the operations previously described.

If, for any reason it becomes necessary to stop the machine, it may be done by simply depressing the pedal —54— of the lever —52—, thereby throwing the clutch —48— out of locking connection with the pulley —50— and when the clutch is thus disconnected, the machine may be operated manually by means of the hand wheel —51—.

What I claim is:—

1. In a collar molding and edging machine, a frame, a shaping head carried by the frame, a rotary and vertically movable shaft carried by the frame, a carriage mounted on the shaft, a collar receiving ring eccentrically mounted on said carriage, a lever having one end connected to said shaft and its opposite end provided with a slidable pivotal connection to the frame, a yoke connected to said lever intermediate the connections of the lever to the frame and shaft, respectively, means for raising and lowering the yoke, and a spring secured to the frame and to the lever intermediate the connection of the yoke to the lever and the pivotal slidable connection of the lever to the frame.

2. In a collar molding and edging machine, a shaping head, a rotary and vertically movable shaft, a carriage mounted on said shaft, a collar receiving ring eccentrically mounted on said carriage, a lever for moving said shaft vertically, a yoke connected to said lever, means allowing the yoke and lever to move vertically after the ring has been brought into pressing coaction with the shaping head by vertical movement of said shaft, means actuated by said yoke for applying pressure beneath the collar supporting ring when the ring is in pressing coaction with the head, and means for producing relative rotary movement of the collar receiving ring and the shaping head while they are in pressing coaction.

3. In a collar molding and edging machine, a shaping head, a rotary and vertically movable shaft, a carriage mounted on said shaft, a collar receiving ring eccentrically mounted on said carriage, a lever for moving said shaft vertically, a yoke connected to said lever, means allowing the yoke and lever to move vertically after the ring has been brought into pressing coaction with the shaping head by vertical movement of said shaft, and means actuated by said yoke for applying pressure beneath the collar supporting ring when the ring is in pressing coaction with the head.

In witness whereof I have hereunto set my hand this 14th day of May, 1915.

JOHN J. SELTENREICH.

Witnesses:
H. E. CHASE,
E. A. THOMPSON.

Copies of this patent may be obtained for five cents each, by addressing the "Commissioner of Patents, Washington, D. C."